(12) United States Patent
Samen (10) Patent No.: US 10,370,809 B1
(45) Date of Patent: Aug. 6, 2019

(54) FECES RETRIEVAL ASSEMBLY (71) Applicant: Moris Samen, Stamford, CT (US)

(72) Inventor: Moris Samen, Stamford, CT (US)

(*) Notice: Subject to any disclaimer, the term of this patent is extended or adjusted under 35 U.S.C. 154(b) by 0 days.

(21) Appl. No.: 16/135,038

(22) Filed: Sep. 19, 2018

(51) Int. Cl.
*E01H 1/12* (2006.01)
*A01K 23/00* (2006.01)
*A01K 27/00* (2006.01)

(52) U.S. Cl.
CPC ......... *E01H 1/1206* (2013.01); *A01K 27/003* (2013.01); *A01K 27/006* (2013.01); *A01K 23/005* (2013.01); *E01H 2001/1266* (2013.01); *E01H 2001/1273* (2013.01); *E01H 2001/1293* (2013.01)

(58) Field of Classification Search
CPC ............ E01H 1/1206; E01H 2001/128; E01H 2001/1226; A01K 23/005; A01K 27/003
USPC .......................................... 294/1.3, 1.4, 100
See application file for complete search history.

(56) References Cited

U.S. PATENT DOCUMENTS

| 2,594,908 | A | * | 4/1952 | Gaulke | E21B 11/005 |
| | | | | | 248/481 |
| 4,146,260 | A | | 3/1979 | Carrington | |
| 4,225,169 | A | * | 9/1980 | DeToma | B25J 1/04 |
| | | | | | 294/1.4 |
| 4,467,802 | A | * | 8/1984 | Maslanka | A61B 17/221 |
| | | | | | 294/100 |
| 4,623,184 | A | * | 11/1986 | Houston | B65G 7/12 |
| | | | | | 294/100 |
| 4,805,951 | A | * | 2/1989 | Andersson | B23Q 7/043 |
| | | | | | 294/116 |
| 5,647,622 | A | * | 7/1997 | Schectnnan | B25J 1/02 |
| | | | | | 294/111 |
| 7,695,035 | B2 | | 4/2010 | Sumner | |
| 7,841,303 | B2 | | 11/2010 | Perez Tomas | |
| 8,833,817 | B2 | | 9/2014 | Kovarik | |
| 8,925,495 | B1 | | 1/2015 | Lee | |
| 2009/0261604 | A1 | | 10/2009 | Rodriguez | |
| 2011/0232586 | A1 | * | 9/2011 | Levy | A01K 13/00 |
| | | | | | 119/795 |
| 2012/0098287 | A1 | * | 4/2012 | Johnson | H01J 9/003 |
| | | | | | 294/192 |
| 2013/0125834 | A1 | * | 5/2013 | Gee | A01K 27/003 |
| | | | | | 119/795 |
| 2015/0075447 | A1 | * | 3/2015 | Chefetz | A01K 27/004 |
| | | | | | 119/796 |
| 2016/0235040 | A1 | * | 8/2016 | Beck | A01K 27/009 |

* cited by examiner

Primary Examiner — Paul T Chin (57) ABSTRACT

A feces retrieval assembly for collecting animal feces from the ground includes a housing that has an opening extending therethrough to define a handle for gripping the housing. A plurality of bags is stored in the housing and a grabbing unit is coupled to the housing. The grabbing unit is actuatable into an extended position to extend away from the housing and being directed toward feces on the ground. The grapping unit is actuated into the extended position for being positioned around feces on the ground. The grabbing unit is actuatable into a grabbing position to grab the feces on the ground for disposal. The grabbing unit is actuatable into a retracted position to retract the grabbing unit. A lighting unit is coupled to the housing and the lighting unit emits light outwardly from the housing for illuminating a darkened area.

18 Claims, 6 Drawing Sheets

FECES RETRIEVAL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to retrieval devices and more particularly pertains to a new retrieval device for collecting animal feces from the ground.

BRIEF SUMMARY OF THE INVENTION

An embodiment of the disclosure meets the needs presented above by generally comprising a housing that has an opening extending therethrough to define a handle for gripping the housing. A plurality of bags is stored in the housing and a grabbing unit is coupled to the housing. The grabbing unit is actuatable into an extended position to extend away from the housing and being directed toward feces on the ground. The grapping unit is actuated into the extended position for being positioned around feces on the ground. The grabbing unit is actuatable into a grabbing position to grab the feces on the ground for disposal. The grabbing unit is actuatable into a retracted position to retract the grabbing unit. A lighting unit is coupled to the housing and the lighting unit emits light outwardly from the housing for illuminating a darkened area.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
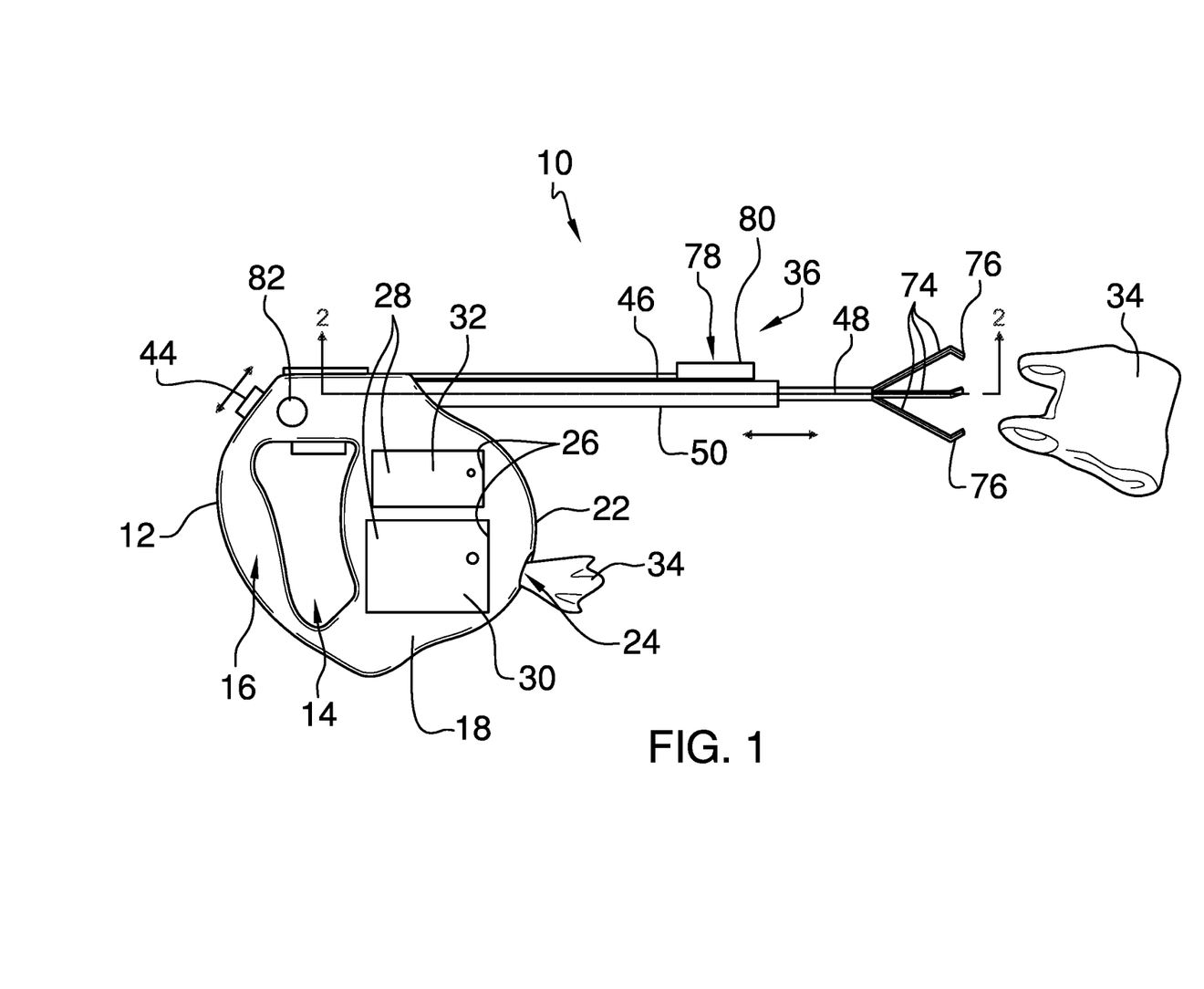
FIG. 1 is a perspective view of a feces retrieval assembly according to an embodiment of the disclosure.
Figure 2:
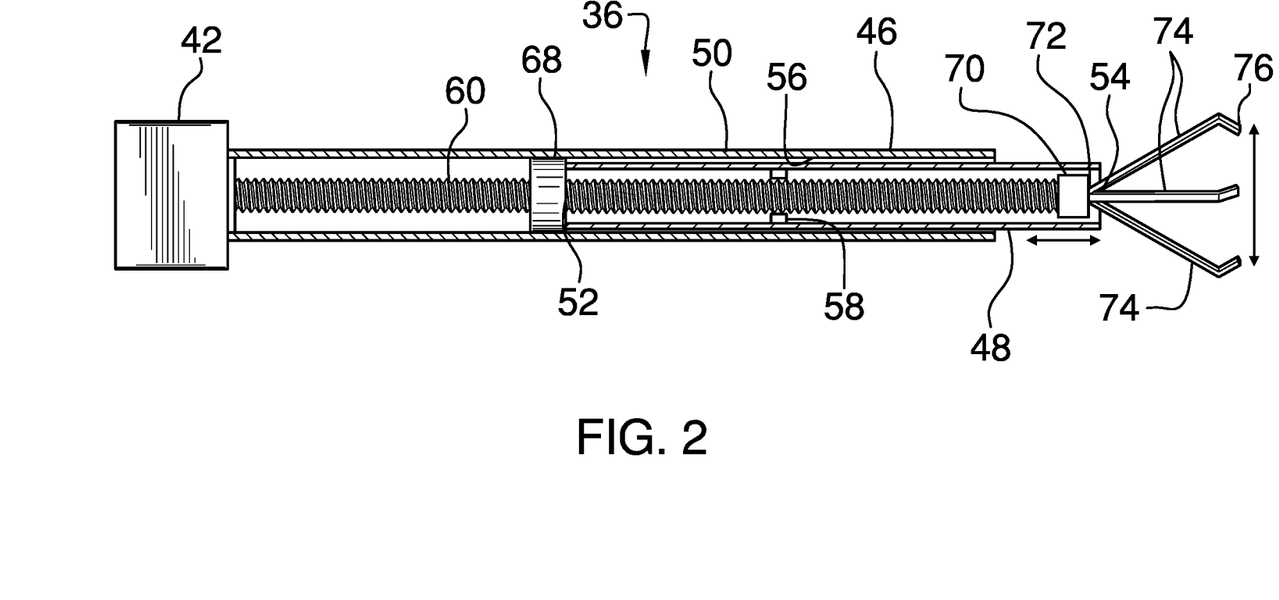
FIG. 2 is a cross sectional view taken along line 2-2 of FIG. 1 of an embodiment of the disclosure.
Figures 3, 4:
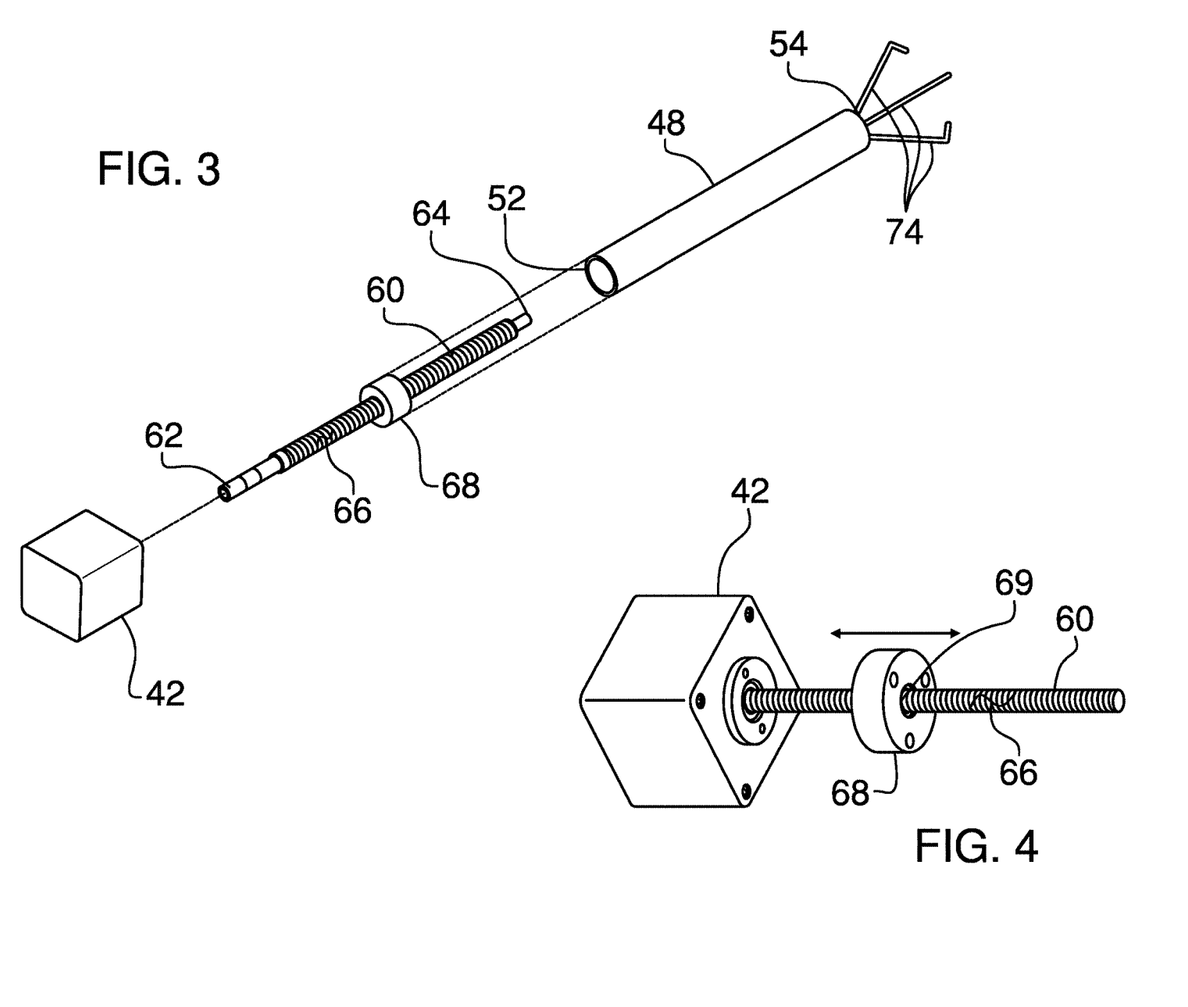
FIG. 3 is an exploded perspective view of a grabbing unit of an embodiment of the disclosure.
FIG. 4 is a perspective view of motor, a screw and a collar of an embodiment of the disclosure.
Figure 5:
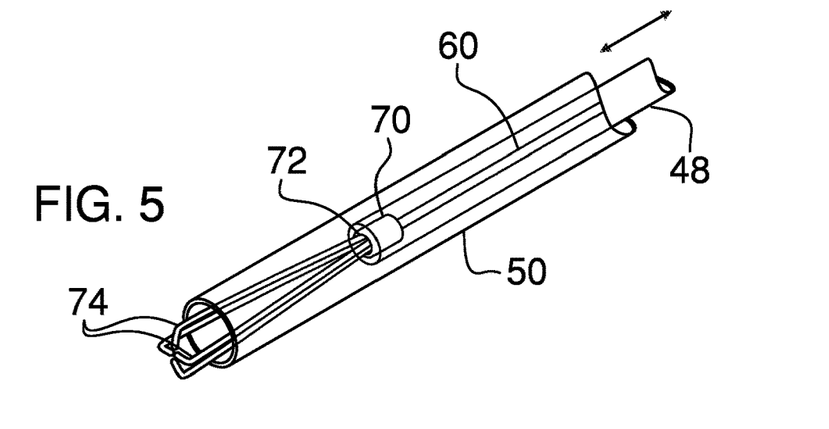
FIG. 5 is a phantom view grabbing unit of an embodiment of the disclosure.
Figure 6:
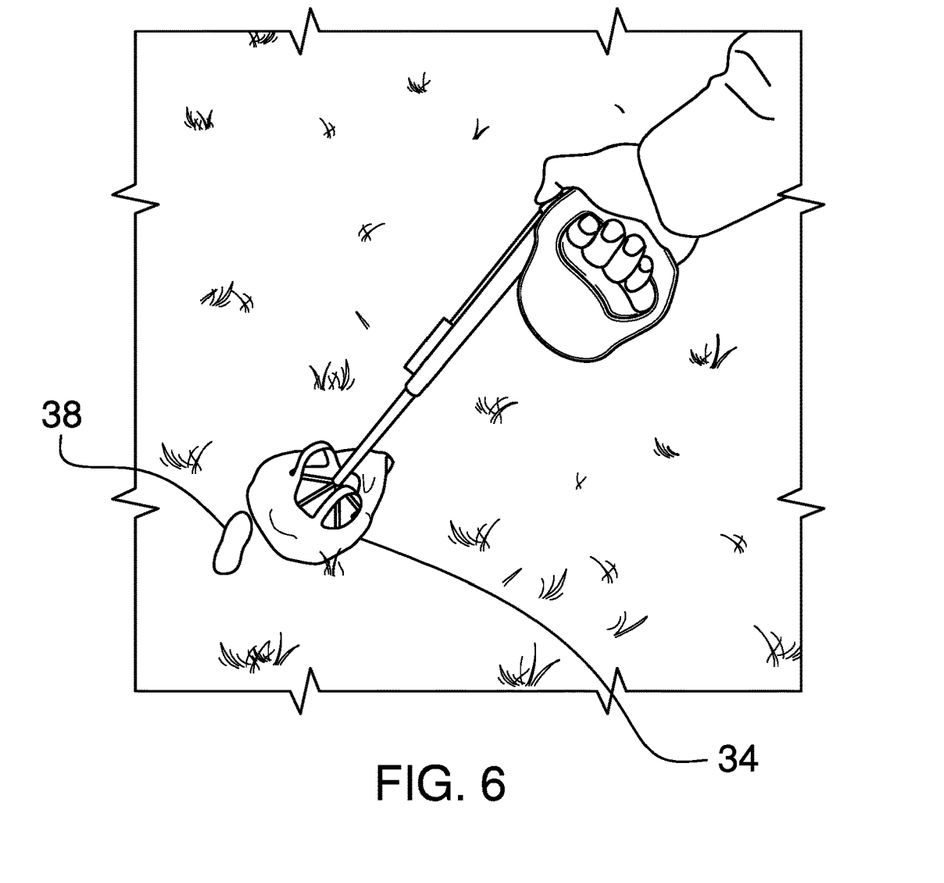
FIG. 6 is a perspective in-use view of an embodiment of the disclosure.
Figure 7:
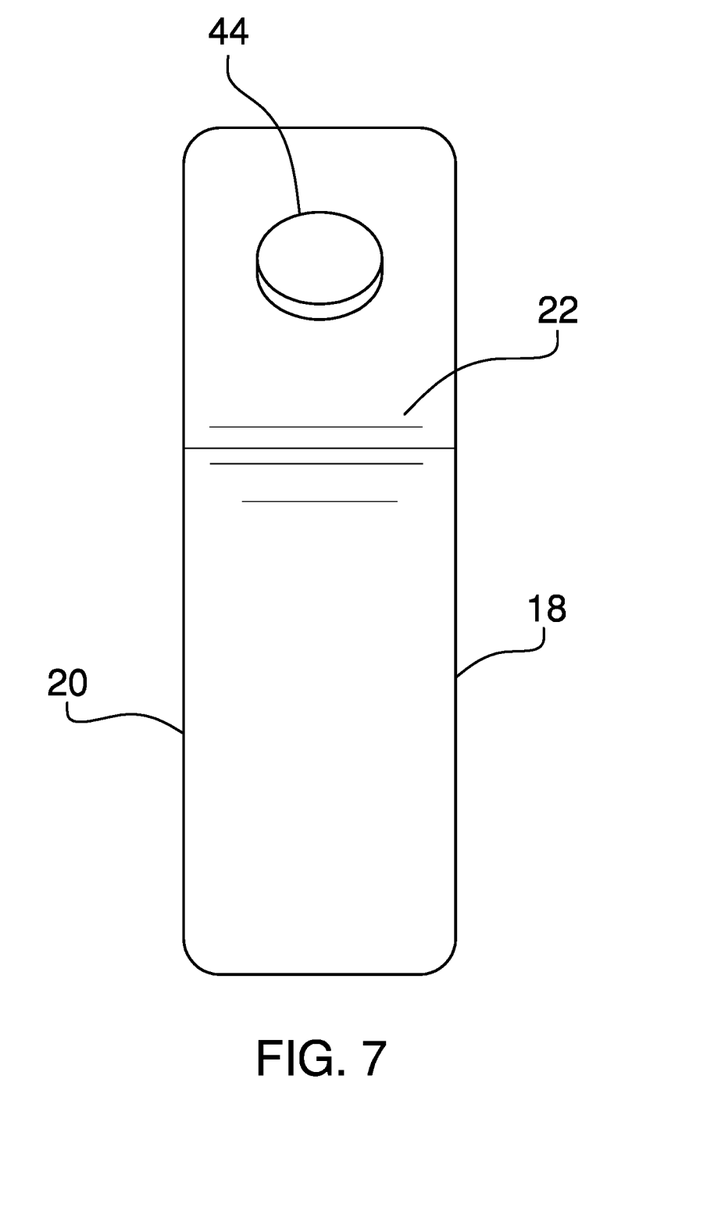
FIG. 7 is a back view of an embodiment of the disclosure.
Figure 8:
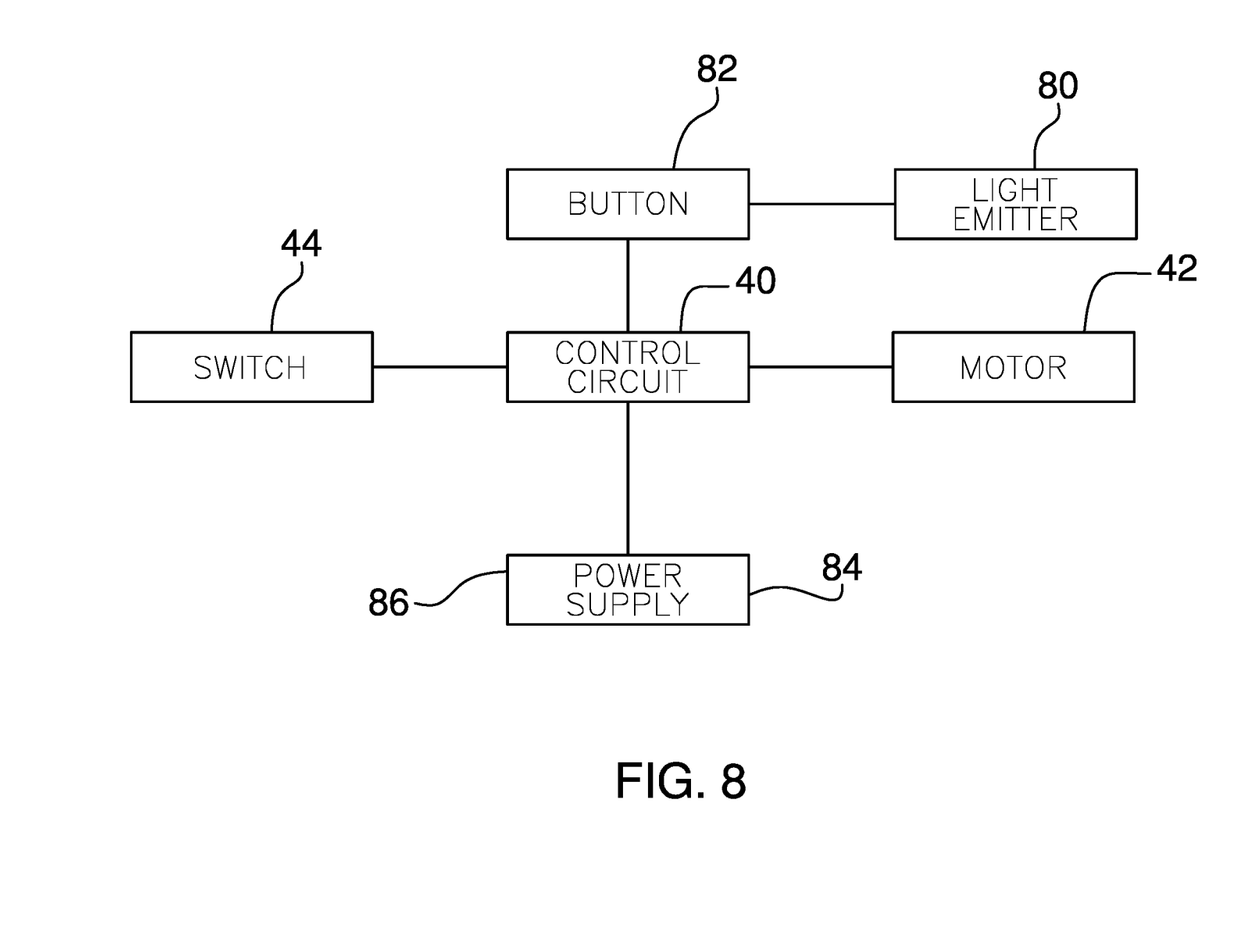
FIG. 8 is a schematic view of an embodiment of the disclosure.

With reference now to the drawings, and in particular to FIGS. 1 through 8 thereof, a new retrieval device embodying the principles and concepts of an embodiment of the disclosure and generally designated by the reference numeral 10 will be described.

As best illustrated in FIGS. 1 through 8, the feces retrieval assembly 10 generally comprises a housing 12 that has an opening 14 extending therethrough to define a handle 16 for gripping the housing 12. The housing 12 has a first lateral wall 18, a second lateral wall 20 and a medial wall 22 extending therebetween. The medial wall 22 is continuously and irregularly arcuate such that the housing 12 has a rounded cross section taken along a line extending through the first 18 and second 20 lateral walls and the housing 12 is hollow. The opening 14 extends through the first 18 and second 20 lateral walls. The medial wall 22 has an aperture 24 extending into an interior of the housing 12 and the first lateral wall 18 has a pair of holes 26 each extending into the interior of the housing 12.

A pair of doors 28 is included and each of the doors 28 is hingedly coupled to the first lateral wall 18 of the housing 12. Each of the doors 28 is aligned with a respective one of the holes 26 for closing the respective hole. The pair of doors 28 includes a bag door 30 and a power supply door 32. A plurality of bags 34 is included and each of the bags 34 is stored in the housing 12. Moreover, each of the bags 34 is removable from the housing 12 through the aperture 24 in the medial wall 22. The hole 26 associated with the bag door 30 is in fluid communication with the aperture 24 in the medial wall 22 to facilitate the bags 34 to be loaded in the housing 12.

A grabbing unit 36 is provided and the grabbing unit 36 is coupled to the housing 12. The grabbing unit 36 is actuatable into an extended position to extend away from the housing 12 and is directed toward feces 38 on the ground.

The grabbing unit 36 is biased into a gripping position when the grapping unit is actuated into the extended position. In this way the grabbing unit 36 can be positioned around feces 38 on the ground. The feces 38 may be animal feces from a domesticated dog or the like. The grabbing unit 36 is actuatable into a retracted position to retract the grabbing unit 36.

The grabbing unit 36 comprises a control circuit 40 that is positioned within the housing 12. A motor 42 is positioned within the housing 12 and the motor 42 is electrically coupled to the control circuit 40. The motor 42 is turned on to rotate in a first direction and a second direction and the motor 42 may be an electric motor 42 or the like. A switch 44 is movably coupled to the housing 12 and the switch 44 is electrically coupled to the control circuit 40. The motor 42 is turned on to rotate in the first direction when the switch 44 is manipulated into a first position. Additionally, the motor 42 is turned on to rotate in the second direction when the switch 44 is manipulated into a second position. The switch 44 is biased into an off position to turn the motor 42 off.

A tube 46 is coupled to and extends away from the medial wall 22 of the housing 12 and the tube 46 is aligned with the motor 42. The tube 46 has a first portion 48 that is slidably positioned in a second portion 50 such that the tube 46 has a telescopically adjustable length. The first portion 48 of the tube 46 has a first end 52 is positioned within the second portion 50 of the tube 46, a second end 54 and an inside surface 56 extending therebetween. A stop 58 is coupled to the inside surface 56 of the first portion 48 of the tube 46.

A screw 60 is included that has a first end 62, a second end 64 and an outer surface 66 extending therebetween. The screw 60 is positioned within the tube 46, the first end 62 of screw 60 is rotatably coupled to the motor 42 and the outer surface 66 is threaded. A collar 68 is provided that has an inwardly facing surface 69. The screw 60 extends through the collar 68 having the inwardly facing surface 68 threadably engages the outer surface 66 of the screw 60. The collar 68 is urged to travel toward the second end 64 of the screw 60 when the motor 42 is turned on to rotate in the first direction. The collar 68 is urged to travel toward the first end 62 of the screw 60 when the motor 42 is turned on to rotate in the second direction. The collar 68 abutting the first end 62 of the first portion 48 of the tube 46 and urges the first portion 48 of the tube 46 to extend outwardly from the second portion 50 of the tube 46 when the motor 42 is turned on to rotate in the first direction.

A coupler 70 is coupled to the second end 64 of screw 60 and the coupler 70 has a distal end 72 with respect to the second end 54 of the screw 60. The coupler 70 is positioned within the first portion 48 of the tube 46. A plurality of fingers 74 is each coupled to the distal end of the coupler 70. Moreover, each of the fingers 74 is biased to radiate outwardly from a line extending through the distal end 72 of the coupler 70 and the second end 64 of the screw 60. Each of the fingers 74 has a distal end 76 with respect to the coupler 70 and each of the fingers 74 is bent such that the distal end 76 of each of the fingers 74 is directed toward each other.

The coupler 70 travels toward the second end 54 of the first portion 48 of the tube 46 when the motor 42 is turned on the rotate in the first direction. Thus, each of the fingers 74 is urged outwardly from the second end 54 of the first portion 48 of the tube 46. One of the bags 34 is positioned around the fingers 74 when the fingers 74 are urged outwardly from the first portion 48 of the tube 46. The coupler 70 travels toward the stop 58 in the first portion 48 of the tube 46 when the motor 42 is turned on to rotate in the second direction. Additionally, each of the fingers 74 is retracted into the second end 54 of the first portion 48 of the tube 46 when the motor 42 is turned on to rotate in the second direction. In this way the fingers 74 are urged to close around the feces 38 on the ground. The coupler 70 abuts the stop 58 and urges the first portion 48 of the tube 46 to retract into the second portion 50 of the tube 46 when the motor 42 is turned on to rotate in the second direction.

A lighting unit 78 is coupled to the housing 12 to emit light outwardly from the housing 12 for illuminating a darkened area. The lighting unit 78 comprises a light emitter 80 that is coupled to the tube 46 and the light emitter 80 is electrically coupled to the control circuit 40. The light emitter 80 is positioned on the second portion 50 of the tube 46 and the light emitter 80 is directed toward the second end 64 of the first portion 48 of the tube 46. In this way the light emitter 80 directs light along the tube 46 for illuminating the feces 38 on the ground. A button 82 is coupled to the housing 12 and the button 82 is electrically coupled to the control circuit 40. The button 82 turns the light emitter 80 on and off, and the light emitter 80 may comprise an LED or the like.

A power supply 84 is positioned within the housing 12 and the power supply 84 is electrically coupled to the control circuit 40. The power supply 84 comprises at least one battery 86 and the power supply 84 is positioned beneath the power supply door 32.

In use, a dog leash or the like may be coupled to the housing 12 for walking a dog outdoors. The switch 44 is manipulated into the first position to fully extend the first portion 48 of the tube 46 and to urge the fingers 74 outwardly from the second end 54 of the first portion 48 of the tube 46 when the dog defecates on the ground. One of the bags 34 is removed from the housing 12 and the bag 34 is positioned around the fingers 74. The tube 46 is directed toward the ground thereby facilitating the fingers 74 to be positioned around the feces 38 left by the dog.

The switch 44 is manipulated into the second position until the fingers 74 close around the feces 38 thereby facilitating the bag 34 on the fingers 74 to be closed around the feces 38. In this way the feces 38 is collected in the bag 34 that is positioned around the fingers 74. The switch 44 is manipulated into the first position thereby facilitating the fingers 74 to open and release the feces 38 and the bag 34 into a garbage can or other receptacle. The switch 44 is manipulated into the second position to fully retract the fingers 74 and the first portion 48 of the tube 46 when the feces 38 have been released into the garbage can.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A feces retrieval assembly being configured to grab feces from the ground, said assembly comprising:
  a housing having an opening extending therethrough to define a handle for gripping said housing;
  a plurality of bags, each of said bags being stored in said housing;
  a grabbing unit being coupled to said housing, said grabbing unit being actuatable into an extended position to extend away from said housing and being directed toward feces on the ground, said grabbing unit being biased into a gripping position when said grapping unit is actuated into said extended position wherein said grabbing unit is configured to be positioned around feces on the ground, said grabbing unit being actuatable into a grapping position for grapping the feces on the ground for disposal, said grabbing unit being actuatable into a retracted position to retract said grabbing unit; and
  a lighting unit being coupled to said housing wherein said lighting unit is configured to emit light outwardly from said housing for illuminating a darkened area.

2. The assembly according to claim 1, wherein said housing has a first lateral wall, a second lateral wall and a medial wall extending therebetween, said medial wall being continuously and irregularly arcuate such that said housing has a rounded cross section taken along a line extending through said first and second lateral walls, said housing being hollow, said opening extending through said first and second lateral walls.

3. The assembly according to claim 2, wherein said medial wall has an aperture extending into an interior of said housing.

4. The assembly according to claim 2, wherein said first lateral wall has a pair of holes each extending into said interior of said housing.

5. The assembly according to claim 4, further comprising a pair of doors, each of said doors being hingedly coupled to said first lateral wall of said housing, each of said doors being aligned with a respective one of said holes for closing said respective hole.

6. The assembly according to claim 1, wherein said grabbing unit comprises:
  a control circuit being positioned within said housing; and
  a motor being positioned within said housing, said motor being electrically coupled to said control circuit, said motor being turned on to rotate in a first direction and a second direction.

7. The assembly according to claim 6, further comprising a switch being movably coupled to said housing, said switch being electrically coupled to said control circuit, said motor being turned on to rotate in said first direction when said switch is manipulated into a first position, said motor being turned on to rotate in said second direction when said switch is manipulated into a second position, said switch being biased into an off position to turn said motor off.

8. The assembly according to claim 7, further comprising a tube being coupled to and extending away from said medial wall of said housing, said tube being aligned with said motor, said tube having a first portion being slidably positioned in a second portion such that said tube has a telescopically adjustable length, said first portion of said tube having a first end being positioned within said second portion of said tube, a second end and an inside surface extending therebetween.

9. The assembly according to claim 8, further comprising a stop being coupled to said inside surface of said first portion of said tube.

10. The assembly according to claim 9, further comprising a screw having a first end, a second end and an outer surface extending therebetween, said screw being positioned within said tube, said first end of screw being rotatably coupled to said motor, said outer surface being threaded.

11. The assembly according to claim 10, further comprising a collar having an inwardly facing surface, said screw extending through said collar having said inwardly facing surface threadably engaging said outer surface of said screw, said collar being urged to travel toward said second end of said screw when said motor is turned on to rotate in said first direction, said collar being urged to travel toward said first end of said screw when said motor is turned on to rotate in said second direction.

12. The assembly according to claim 11, wherein said collar abuts said first end of said first portion of said tube, said collar urging said first portion of said tube to extend outwardly from said second portion of said tube when said motor is turned on to rotate in said first direction.

13. The assembly according to claim 12, further comprising a coupler being coupled to said second end of screw, said coupler having a distal end with respect to said second end of said screw, said coupler being positioned within said first portion of said tube.

14. The assembly according to claim 13, further comprising a plurality of fingers, each of said fingers being coupled to said distal end of said coupler, each of said fingers being biased to radiate outwardly from a line extending through said distal end of said coupler and said second end of said screw.

15. The assembly according to claim 14, wherein:
  said coupler travels toward said second end of said first portion of said tube when said motor is turned on said rotate in said first direction having each of said fingers being urged outwardly from said second end of said first portion of said tube, one of said bags being positioned around said fingers when said fingers are urged outwardly from said first portion of said tube;
  said coupler travelling toward said stop in said first portion of said tube when said motor is turned on to rotate in said second direction having each of said fingers being retracted into said second end of said first portion of said tube wherein said fingers are configured to close around the feces on the ground; and
  said coupler abuts said stop and urges said first portion of said tube to retract into said second portion of said tube when said motor is turned on to rotate in said second direction.

16. The assembly according to claim 8, wherein said lighting unit comprises:
  a light emitter being coupled to said tube, said light emitter being electrically coupled to said control circuit; said light emitter being positioned on said second portion of said tube, said light emitter being directed toward said second end of said first portion of said tube wherein said light emitter is configured to direct light along said tube for illuminating the feces on the ground; and
  a button being coupled to said housing, said button being electrically coupled to said control circuit, said button turning said light emitter on and off.

17. The assembly according to claim 6, further comprising a power supply being positioned within said housing, said power supply being electrically coupled to said control circuit, said power supply comprising at least one battery.

18. A feces retrieval assembly being configured to grab feces from the ground, said assembly comprising:
- a housing having an opening extending therethrough to define a handle for gripping said housing, said housing having a first lateral wall, a second lateral wall and a medial wall extending therebetween, said medial wall being continuously and irregularly arcuate such that said housing has a rounded cross section taken along a line extending through said first and second lateral walls, said housing being hollow, said opening extending through said first and second lateral walls, said medial wall having an aperture extending into an interior of said housing, said first lateral wall having a pair of holes each extending into said interior of said housing;
- a pair of doors, each of said doors being hingedly coupled to said first lateral wall of said housing, each of said doors being aligned with a respective one of said holes for closing said respective hole;
- a plurality of bags, each of said bags being stored in said housing, each of said bags being removable from said housing through said aperture in said medial wall; and
- a grabbing unit being coupled to said housing, said grabbing unit being actuatable into an extended position to extend away from said housing and being directed toward feces on the ground, said grabbing unit being biased into a gripping position when said grapping unit is actuated into said extended position wherein said grabbing unit is configured to be positioned around feces on the ground, said grabbing unit being actuatable into a grapping position for grapping the feces on the ground for disposal, said grabbing unit being actuatable into a retracted position to retract said grabbing unit, said grabbing unit comprising:
  - a control circuit being positioned within said housing;
  - a motor being positioned within said housing, said motor being electrically coupled to said control circuit, said motor being turned on to rotate in a first direction and a second direction;
  - a switch being movably coupled to said housing, said switch being electrically coupled to said control circuit, said motor being turned on to rotate in said first direction when said switch is manipulated into a first position, said motor being turned on to rotate in said second direction when said switch is manipulated into a second position, said switch being biased into an off position to turn said motor off;
  - a tube being coupled to and extending away from said medial wall of said housing, said tube being aligned with said motor, said tube having a first portion being slidably positioned in a second portion such that said tube has a telescopically adjustable length, said first portion of said tube having a first end being positioned within said second portion of said tube, a second end and an inside surface extending therebetween;
  - a stop being coupled to said inside surface of said first portion of said tube;
  - a screw having a first end, a second end and an outer surface extending therebetween, said screw being positioned within said tube, said first end of screw being rotatably coupled to said motor, said outer surface being threaded;
  - a collar having an inwardly facing surface, said screw extending through said collar having said inwardly facing surface threadably engaging said outer surface of said screw, said collar being urged to travel toward said second end of said screw when said motor is turned on to rotate in said first direction, said collar being urged to travel toward said first end of said screw when said motor is turned on to rotate in said second direction, said collar abutting said first end of said first portion of said tube, said collar urging said first portion of said tube to extend outwardly from said second portion of said tube when said motor is turned on to rotate in said first direction;
  - a coupler being coupled to said second end of screw, said coupler having a distal end with respect to said second end of said screw, said coupler being positioned within said first portion of said tube; and
  - a plurality of fingers, each of said fingers being coupled to said distal end of said coupler, each of said fingers being biased to radiate outwardly from a line extending through said distal end of said coupler and said second end of said screw, said coupler travelling toward said second end of said first portion of said tube when said motor is turned on said rotate in said first direction having each of said fingers being urged outwardly from said second end of said first portion of said tube, one of said bags being positioned around said fingers when said fingers are urged outwardly from said first portion of said tube, said coupler travelling toward said stop in said first portion of said tube when said motor is turned on to rotate in said second direction having each of said fingers being retracted into said second end of said first portion of said tube wherein said fingers are configured to close around the feces on the ground, said coupler abutting said stop and urging said first portion of said tube to retract into said second portion of said tube when said motor is turned on to rotate in said second direction;
- a lighting unit being coupled to said housing wherein said lighting unit is configured to emit light outwardly from said housing for illuminating a darkened area, said lighting unit comprising:
  - a light emitter being coupled to said tube, said light emitter being electrically coupled to said control circuit; said light emitter being positioned on said second portion of said tube, said light emitter being directed toward said second end of said first portion of said tube wherein said light emitter is configured to direct light along said tube for illuminating the feces on the ground; and
  - a button being coupled to said housing, said button being electrically coupled to said control circuit, said button turning said light emitter on and off; and
- a power supply being positioned within said housing, said power supply being electrically coupled to said control circuit, said power supply comprising at least one battery.

\* \* \* \* \*